US012807266B2

(12) United States Patent
Sintorn

(10) Patent No.: US 12,807,266 B2
(45) Date of Patent: Nov. 24, 2026

(54) SUSPENSION ARRANGEMENT FOR ADJUSTING VEHICLE SUSPENSION

(71) Applicant: Ohlins Group AB, Upplands Väsby (SE)

(72) Inventor: Torkel Sintorn, Vaxholm (SE)

(73) Assignee: Ohlins Group AB, Upplands Vasby (SE)

( * ) Notice: Subject to any disclaimer, the term of this patent is extended or adjusted under 35 U.S.C. 154(b) by 238 days.

(21) Appl. No.: 18/436,150

(22) Filed: Feb. 8, 2024

(65) Prior Publication Data

US 2024/0270344 A1 Aug. 15, 2024

(30) Foreign Application Priority Data

Feb. 10, 2023 (EP) .................................... 23156149

(51) Int. Cl.
*B62K 25/26* (2006.01)

(52) U.S. Cl.
CPC .................................... *B62K 25/26* (2013.01)

(58) Field of Classification Search
CPC .. B62K 25/26; B62K 25/04; B62K 2025/044; B60G 2204/129; B60G 2204/421; B60G 2300/12; B60G 13/005
See application file for complete search history.

(56) References Cited

U.S. PATENT DOCUMENTS 10,981,425 B1 * 4/2021 Compton ............... B60G 7/008
2005/0116437 A1 6/2005 Furukawa et al.
2006/0001223 A1 * 1/2006 Krieger ................ B60G 15/067 280/6.15
2006/0254840 A1 * 11/2006 Strong ..................... B60G 5/03 280/43
2014/0083785 A1 3/2014 Dantzie
2022/0016950 A1 1/2022 Ericksen et al.
(Continued)

FOREIGN PATENT DOCUMENTS

CN 101484349 A * 7/2009 ........... B62K 25/286
CN 217048916 U 7/2022
CN 115214831 A * 10/2022 ............. B62K 25/04
(Continued)

OTHER PUBLICATIONS

Sep. 26, 2023. Extended European Search Report in European Patent Application No. 23156149.9.
(Continued)

*Primary Examiner* — Drew J Brown
(74) *Attorney, Agent, or Firm* — Kagan Binder, PLLC

(57) ABSTRACT

The present disclosure relates to a suspension arrangement for a vehicle, the vehicle comprising a wheel arranged on a swing arm adapted to be pivotable relative a vehicle part about a swing arm pivot point, the suspension arrangement comprising: a shock absorber adapted to be arranged relative the vehicle part and the swing arm so that a first mounting member provides a first pivot point and a second mounting member provides a second pivot point, a pivot point adjustment device adapted for enabling position adjustment of the first pivot point and/or the second pivot point relative the swing arm to change a steady-state position of the shock absorber relative the swing arm in response to a load change. A vehicle and method of adjustment is also disclosed.

19 Claims, 14 Drawing Sheets

(56) References Cited

U.S. PATENT DOCUMENTS

| | | | | |
|---|---|---|---|---|
| 2022/0185424 | A1 * | 6/2022 | Roseborrough | B62K 25/26 |

FOREIGN PATENT DOCUMENTS

| | | | | | |
|---|---|---|---|---|---|
| CN | 110329414 | B | * | 2/2024 | B62K 15/00 |
| CN | 103619619 | A | | 3/2024 | |
| EP | 1535828 | A2 | | 6/2005 | |
| EP | 2969726 | B1 | * | 8/2025 | B62K 25/286 |
| ES | 2817791 | T3 | * | 4/2021 | B62K 3/02 |
| TW | I893487 | B | * | 8/2025 | B62J 45/4151 |
| WO | WO-2013192622 | A1 | * | 12/2013 | B62K 25/286 |

OTHER PUBLICATIONS

Chinese Office Action for copending CN202410128322.8, 8 pp., Jul. 2, 2026.

* cited by examiner

SUSPENSION ARRANGEMENT FOR ADJUSTING VEHICLE SUSPENSION

CROSS-REFERENCE TO RELATED APPLICATIONS

This application claims the benefit of European Patent Application No. 23156149.9, filed on Feb. 10, 2023. The entire disclosure of the application referenced above is incorporated herein by reference.

TECHNICAL FIELD

The present disclosure relates to a suspension arrangement for adjusting vehicle suspension, and in particular a suspension arrangement for adjusting vehicle suspension for improved weight handling.

BACKGROUND

Suspension arrangements are used for controlling the relative movement between the wheel and vehicle frame of a vehicle to achieve a desired dynamic characteristic. Such solutions allow for improved travel experience, while also increasing longevity of a vehicle by minimizing wear and tear of susceptible vehicle elements. However, the desired damping characteristic can vary greatly depending on road conditions and vehicle load. It is therefore of interest to be able to adjust the damping characteristic of a suspension arrangement.

As an example, US2022016950A1 discloses a system and method for determining when to adjust a suspension based on the type of terrain being traversed by a vehicle. The suspension system incorporates a shock absorber for improving damping characteristics in response to road conditions and vehicle load. However, these types of solutions typically offer many forms of suspension adjustments, which may discourage a vehicle operator to make any adjustments at all, which introduces a safety concern. Moreover, optimal suspension adjustment typically requires professional expertise, in particular when load changes significantly which impacts negatively impacts weight handling.

It is therefore of interest to provide a suspension arrangement for adjusting vehicle suspension with improved weight handling and facilitated adjustment.

SUMMARY

It is an object of the present disclosure to provide an improved solution that alleviates at least some of the mentioned drawbacks with present solutions, and/or other drawbacks with present solutions. A first object of the disclosure is to provide a suspension arrangement for a vehicle which facilitates suspension adjustment. A second object of the disclosure is to provide a suspension arrangement for a vehicle enabling facilitated weight handling and damping adjustment. A third object of the disclosure is to provide a vehicle comprising said suspension arrangement. A fourth object of the disclosure is to provide a bicycle with said suspension arrangement. A fifth object of the disclosure is to provide a method of adjusting suspension of a vehicle. Additional preferred embodiments are defined in dependent claims. More advantageous embodiments are mentioned in the description.

With new trends and lifestyles, there is a greater need for weight handling systems for micromobility short distance travelling. Micromobility refers to a range of small, lightweight vehicles operating at relatively low speeds, and can include both human-powered and electric vehicles. Micromobility vehicles include vehicles such as bicycles, e-bikes, electric scooters, electric skateboards, shared bicycle fleets, cargo bikes (which may comprise two or more wheels), and electric pedal assisted bicycles, and more. Considering an increased diversity of trends and lifestyles, it is from an economic perspective preferable to provide vehicles which can be adjusted in terms of vehicle operating height (ride height for bikes), spring rate, damping ratio, etc. Since micromobility vehicles are typically very light, added weight to the vehicle (for instance by the weight of an operator of the vehicle) has a big impact. This is in particular impactful for cargo bikes, where a load on the bike may vary+100% or more between different situations. For example, a minimal load situation may involve a relatively lightweight rider only, whereas a heavier load situation may include a heavy rider, one or more kids as passenger(s) and additional load in the form of e.g. grocery bags. The need to change the suspension setup is larger in order to improve and/or maximize performance and safety. But since typically many individual adjustments must be made, it makes proper adjustment more cumbersome and discourages a vehicle operator to make any adjustments at all. For this reason, the inventors of this disclosure have realized that this issue can be solved by providing a suspension arrangement which enables proper adjustment in terms of vehicle operating height, spring rate, damping ratio, etc., with one action only.

The disclosure herein summarized, described, and defined in terms of favorable embodiments is based on adjusting the relative position and/or orientation of a shock absorber relative a swing arm onto which a wheel is arranged between different steady-state positions. This is enabled by providing the shock absorber to a vehicle so that it is pivotably arranged via the shock absorber's mounting members between a vehicle part and a swing arm, and then enabling at least one of the mounting members to be moveable relative the swing arm to adjust a shock absorber's steady state position. As a result, a vehicle's resting position or 1-g position can be adjusted in response to a load change, whether the load change is determined beforehand or measured once it has occurred.

One characteristic of interest for assessing a suspension arrangement is the motion ratio. Generally, motion ratio may be defined as the ratio of the displacement of the point of interest to that of another point. In the context of vehicle suspension, it may be used to describe how much force is transmitted to a vehicle frame. One formula for motion ratio may be $$MR = \frac{WT}{SD} \tag{1}$$

where MR is motion ratio, WT is wheel travel, and SD is spring displacement. Generally, a greater wheel travel relative a vehicle frame indicates that the vehicle frame absorbs a lower amount of force. Spring displacement may be related to Hooke's law according to the formula $$F = -k\,s \tag{2}$$

where k is the spring constant, F is the force, and s is the extension or compression distance. The spring displacement SD above and extension or compression distance s may be the same. From Hooke's law, it can be seen that when a damper compress less for the same force, it leads to a higher spring constant k which indicates the damper is adept at absorbing a larger amount of forces rather than transmitting them to a vehicle frame.

From this, it can be seen from the formula of motion ratio above that the amount of force transmitted to a vehicle frame reduces with increase in motion ratio. As an alternative, installation ratio may be used to describe this characteristic. Installation ratio may be the motion ratio inverted.

One other characteristic of interest for assessing a suspension arrangement is the wheel rate. Wheel rate WR may be defined as the ratio of the spring rate SR of the damper and the motion ratio MR squared $$WR = \frac{SR}{MR^2} \tag{3}$$

where spring rate SR may be the same as the spring constant k in Hooke's law. The wheel rate is effectively the spring rate when measured at the wheel as opposed to at the spring (damper). The wheel rate indicates how much force the damper can absorb.

One other characteristic of interest for assessing a suspension arrangement is the damping ratio. Damping ratio may be defined as a measure describing how rapidly damping oscillations decay from one bounce to the next. A damper disturbed from a steady-state position tends to return to the steady-state position (also known as equilibrium position) but will overshoot, resulting in the damper to bounce around the steady-state position. The damping ratio $\zeta$ may be defined as $$\zeta = \frac{c}{c_c}$$

where $c_c$ is the critical damping, and c is actual damping at wheel, which is related to damping coefficient $c_d$ at damper via formula $$c = \frac{c_d}{MR^2}.$$

A system's equation of motion may be formulated as $$\ddot{x} + 2\zeta\,\omega_n\dot{x} + \omega_n^2 x = u, \tag{4}$$

$$\omega_n = \sqrt{\frac{k}{m}},$$

$$\zeta = \frac{c}{c_c} = \frac{c}{2m\omega_n} = \frac{c}{2\sqrt{mk}},$$

$$u = \frac{F_{external}}{m},$$

where $\omega_n$ is the natural frequency of the system, m is mass, and $F_{external}$ is an external force applied to the system. As seen from the system of equations (4) above, the damping ratio changes with respect to mass m and spring constant k as well as actual damping.

According to a first aspect of the disclosure, a suspension arrangement for a vehicle is provided. Preferably, the suspension arrangement is adapted for a vehicle comprising a wheel arranged on a swing arm adapted to be pivotable relative a vehicle part of the vehicle about a swing arm pivot point. The suspension arrangement comprises a shock absorber. By shock absorber, it may be meant an arrangement comprising a damper and a spring. The spring may be arranged to facilitate the shock absorber to return to a steady-state position. The shock absorber is adapted for providing a first mounting member and a second mounting member mutually displaceable by expansion and compression of the shock absorber, whereby the shock absorber is adapted to be arranged relative the vehicle part and the swing arm so that the first mounting member provides a first pivot point and the second mounting member provides a second pivot point. The suspension arrangement further comprises a pivot point adjustment device adapted for enabling position adjustment of the first pivot point and/or the second pivot point relative the swing arm to change a steady-state position of the shock absorber relative the swing arm in response to a load change.

By arranging the suspension arrangement to a vehicle as described above, the suspension arrangement enables adjustment of the vehicle suspension in terms of vehicle operating height, spring rate, damping ratio, by one action, specifically by moving said one pivot point relative the swing arm. First of all, this adjusts the position and/or orientation of the shock absorber relative the swing arm which impacts the vehicle operating height. Second of all, this adjusts the steady-state position of the shock absorber which impacts the spring rate. This can be seen from equation (2) where a change in steady-state position results in an initial spring displacement, s0=s f, with fraction f being f>0 for initial compression displacement and f<0 for initial expansion displacement, so that the formula takes the form $$F = -k(s + s0) = -k(1 + f)s = -k's$$

with k'=(1+f) k≠k. Thirdly, the damping ratio is impacted according to system of equations (4) in response to a changed spring constant. By this, the suspension arrangement enables a vehicle to be adjusted to a target suspension configuration predetermined based on said load change. Moreover, the disclosure enables suspension adjustment in a plurality of aspects by one action, which thus removes the necessity of adjusting a plurality of different suspension aspects individually form one another, which therefore facilitates adjustment for desired weight handling and damping.

The adjustment of the first and/or second pivot point relative the swing arm may be carried out in response to a load change. A load change may include a load weight change. For instance, the vehicle operator may change from a first person with a first weight to a second person having a second weight different from the first weight. For instance, the vehicle may be loaded with cargo of a weight, or changed, which changes the weight loaded onto the vehicle. A load change may include a change in center of mass. For instance, cargo may be arranged differently to or in the vehicle which impacts the center of mass.

A further advantage of the disclosure is that it allows for adjusting suspension vehicle in view of spring sag.

A further advantage of the disclosure is that the suspension arrangement may be adjusted for desired suspension for driving in view of the load change. This may be in response to e.g., the weight of the vehicle operator or other forms of load change.

The suspension arrangement comprises a shock absorber. By shock absorber, it may be meant a mechanical or hydraulic device designed to absorb and damp shock impulses. Shock absorber and damper may be used interchangeably. The shock absorber may comprise a piston member moveable in a reservoir of a damping fluid. As an example, oil may be used as damping fluid. The piston may comprise one or more holes or channels or apertures for enabling or facilitating the piston to move through the reservoir of damping fluid. The shock absorber may comprise means for adjusting the damping characteristics of the shock absorber. For instance, a pilot valve. Said means may be adapted to be controlled from a distance. Said means may be adapted to be electrically controllable or mechanically controllable.

The first mounting member and/or the second mounting member may comprise means for pivotable connection to the vehicle part and/or the swing arm. The vehicle part may be a vehicle frame or a portion thereof. The swing arm may be directly arranged directly to the vehicle part in a pivoting manner or indirectly arranged to the vehicle part in a pivoting manner. For instance, said first mounting member and/or second mounting member may provide a through-hole for receiving an axle or bolt or the like for enabling said pivoting movement. The shock absorber may be adapted to expand and compress along a displacement axis. Said displacement axis may be a longitudinal axis of the shock absorber. The first mounting member and the second mounting member may be provided so that they mutually move relative each other along said displacement axis. The first mounting member may be arranged proximally or at a first longitudinal end of the shock absorber. The second mounting member may be arranged proximally or at a second longitudinal end of the shock absorber opposite the first longitudinal end.

The vehicle part may be a part or portion of the vehicle frame. The vehicle part may be a part separate from the vehicle frame, optionally moveable relative the vehicle frame in a predetermined movement path.

The suspension arrangement comprises a pivot point adjustment device adapted for enabling position adjustment of the first pivot point and/or the second pivot point. The pivot point adjustment device may be controllable or operable by manual means and/or automatic means. The pivot point adjustment device be controllable or operable via electrical means. The pivot point adjustment device may be controllable or operable from a distance. The pivot point adjustment device may comprise an actuator and/or a linkage arrangement defining one or more pivot points. The pivot point adjustment device may be adapted to couple to the shock absorber to be able to adjust said first and/or second pivot point. The pivot point adjustment device may be arranged to the vehicle part. The pivot point adjustment device may be arranged to the swing arm. The pivot point adjustment device may be arranged to be translationally moveable relative the vehicle part and/or the swing arm.

According to one embodiment, the suspension arrangement comprises a sensor for measuring a suspension parameter which is variable in response to the load change. The sensor may be a position sensor. The suspension parameter may be a positional change of one component relative a reference position, for instance the swing arm relative said vehicle part, a compression factor of the shock absorber, or the like. The sensor may be a sensor adapted for measuring some other physical quantity variable in response to a load change. By measuring said suspension parameter, it is possible to relate how a load change impacts the suspension of the vehicle. This in turn may show how much adjustment of said first pivot point and/or second pivot point is necessary to reach a target suspension configuration. The measured suspension parameter may be displayed to an operator via display means. The measured suspension parameter may directly indicate a suggested adjustment.

According to a further embodiment, the sensor is a position sensor, and the suspension parameter is a position deviation of the swing arm from a reference position relative the vehicle part. The position sensor may be adapted to measure a movement of the swing arm and to convert said movement into a scaled electrical signal. The electrical signal may be displayed on a displaying means in a suitable format. The electrical signal may be provided to automation means for performing automatic adjustment based on said electrical signal. The position sensor may be an angle sensor. The suspension parameter may be an angle deviation of the swing arm relative a reference swing arm position. The position sensor may be a distance sensor. The suspension parameter may be a distance measured between a point located on the vehicle part and a point located on the swing arm.

According to one embodiment, the suspension arrangement comprises means for enabling automatic position adjustment of the first pivot point and/or the second pivot point to change the steady-state position of the shock absorber relative the swing arm based on sensor measurements provided by said sensor. Said means for enabling automatic position adjustment may be referenced as automatic means. Said automatic means may comprise a processing unit, control means for controlling the pivot point adjustment device, one or more sensors, and connecting means for connecting the processing unit to said one or more sensors and connecting the processing unit to said control means. The shock absorber may comprise control means for enabling adjustment of damping characteristic. Said automatic means may comprise connecting means for connecting the processing unit to control means for controlling the shock absorber.

According to one embodiment, the position adjustment of at least one pivot point of the first pivot point and the second pivot point of the shock absorber is enabled by a linear or rotary actuator defining a pivot point movement path along which said one pivot point is moveable. The suspension arrangement may be adapted so that the pivot point movement path is at least partly linear or wholly linear. The suspension arrangement may be adapted so that the pivot point movement path is at least partly curved or wholly curved. The pivot point movement path may be partially linear and partially curved. The suspension arrangement may be adapted so that the pivot point movement path takes a shape determined to provide a desired weight handling characteristic. The linear or rotary actuator may be arranged to move said pivot point along said pivot point movement path. The suspension arrangement may be adapted to comprise both a liner actuator and a rotary actuator for increased flexibility in terms of shape of pivot point movement path which in turn offers a greater flexibility in terms of weight handling.

According to one embodiment, the actuator enables stepless position adjustment of said one pivot point along the pivot point movement path. By this, more precise weight handling is enabled. As an alternative, the actuator may enable stepwise position adjustment of said one pivot point along the pivot point movement path.

According to one embodiment, the actuator is adapted to be attached to the swing arm and adapted for adjusting the position of said one pivot point of the shock absorber relative the swing arm. The shock absorber may be pivotably coupled or connected to the vehicle part via one mounting member and pivotably coupled or connected to the pivot point adjustment device via the actuator attached to the swing arm. By this, the suspension arrangement may be provided with few additional elements, which in turn facilitates installation and/or use of the suspension arrangement. Moreover, with fewer additional elements, a risk of element failure is mitigated.

According to one embodiment, the pivot point movement path and a longitudinal axis of the swing arm are nonparallel. By this arrangement, an adjustment of a pivot point is facilitated. Moreover, an adjustment of a pivot point may impact a vehicle operating height more greatly. The pivot point movement path and a longitudinal axis of the swing arm may be inclined relative one another by an inclination angle. The suspension arrangement may be adapted so that the inclination angle facilitates movement of pivot point adjustment.

According to one embodiment, an inclination angle between the pivot point movement path and the longitudinal axis of the swing arm is adjustable. This may be enabled by the pivot point movement device being at least partially moveable and/or pivotable relative the swing arm, for instance the actuator may be moveable and/or pivotable relative the swing arm. By moving and/or pivoting the pivot point movement device or the actuator specifically, the inclination angle may be adjusted. Adjustment of said inclination may be enabled by said automatic means.

According to one embodiment, the actuator is adapted to be attached to the vehicle part and adapted for adjusting the position of said one pivot point of the shock absorber relative the swing arm. The shock absorber may be pivotably coupled or connected to the swing arm via one mounting member and pivotably coupled or connected to the pivot point adjustment device. By this, the suspension arrangement may be provided with few additional elements, which in turn facilitates installation and/or use of the suspension arrangement. Moreover, with fewer additional elements, a risk of element failure is mitigated.

According to one embodiment, the actuator is translationally moveable relative the swing arm by means of a linkage arrangement providing a third pivot point by which the linkage arrangement is connected to the vehicle part or the swing arm, wherein a distance between said one pivot and the third pivot point is adjustable by means of the actuator. The shock absorber may be pivotably coupled or connected to the swing arm or the vehicle part via one mounting member and pivotably coupled or connected to the pivot point adjustment device. By this, a greater range of motion ratio may be achieved.

According to one embodiment, wherein a first steady-state position provides a stiffer suspension configuration, and a second steady-state position provides a softer suspension configuration. By this, a vehicle equipped with said suspension arrangement may be suitable for being operated with different loads, or driving circumstances such as on-road driving or off-road driving.

According to one embodiment, the suspension arrangement is adapted so that the shock absorber is adjustable from

- a first steady-state position associated with a stiff motion-ratio-to-wheel-travel curve, to
- a second steady-state position associated with a soft motion-ratio-to-wheel-travel curve,
- wherein the soft motion-ratio-to-wheel-travel curve is offset relative the stiff motion-ratio-to-wheel-travel curve at their closest vertical distance by an offset increase of at least +10%, +20%, +30%, +40%, or +50% of the stiff motion-ratio-to-wheel-travel curve. By this, the suspension arrangement may be adapted for defining a wide range of motion ratio depending on wheel travel. The suspension arrangement may be adapted to provide progressive damping.

According to a second aspect of the disclosure, a vehicle comprising the suspension arrangement according to the first aspect of the disclosure or any embodiments thereof. The vehicle may comprise a vehicle part, a swing arm adapted to be pivotable relative the vehicle part about a swing arm pivot point. The vehicle may comprise a wheel arranged to the swing arm. Said vehicle part may be a vehicle frame of the vehicle or form a part of the vehicle frame or be a separate part of the vehicle frame but attached thereto.

According to one embodiment, the vehicle is a bicycle. According to one embodiment, the bicycle is a two-wheeled or three-wheeled bicycle. According to one embodiment, the bicycle is a cargo bike.

According to one embodiment, wherein the vehicle is a micromobility vehicle. The suspension arrangement may be adapted to be compactly designed and/or made of a lightweight material suitable for micromobilty vehicles.

According to a third aspect of the disclosure, a method of adjusting suspension of a vehicle is provided. The method comprises a step of providing a vehicle comprising:

- a vehicle part,
- a swing arm adapted to be pivotable relative the vehicle part about a swing arm pivot point,
- a wheel arranged to the swing arm, and
- a suspension arrangement comprising
- a shock absorber providing a first mounting member and a second mounting member mutually displaceable by expansion and compression of the shock absorber, whereby the shock absorber is arranged between the vehicle part and the swing arm so that the first mounting member provides a first pivot point, and the second mounting member provides a second pivot point.

The method may further comprise a step of determining a load change of the vehicle. The method may further comprise a step of adjusting a position of the first pivot point and/or the second pivot point of the shock absorber relative the swing arm to change a steady-state position of the shock absorber relative the swing arm in response to the determined load change.

According to one embodiment, the method further comprises a step of measuring a suspension parameter which is variable in response to the load change. Said step may be enabled by a sensor adapted for measuring said suspension parameter.

According to one embodiment, the suspension parameter is a position deviation of the swing arm from a reference position relative the vehicle part, and the step of measuring the suspension parameter is done by means of a sensor.

According to one embodiment, the method further comprises a step of automatic position adjustment of the first pivot point and/or the second pivot point based on the sensor measurements provided by said sensor.

BRIEF DESCRIPTION OF THE DRAWINGS

The disclosure will in the following be described in more detail with reference to the enclosed drawings, wherein.

DESCRIPTION OF EMBODIMENTS

Figure 1:
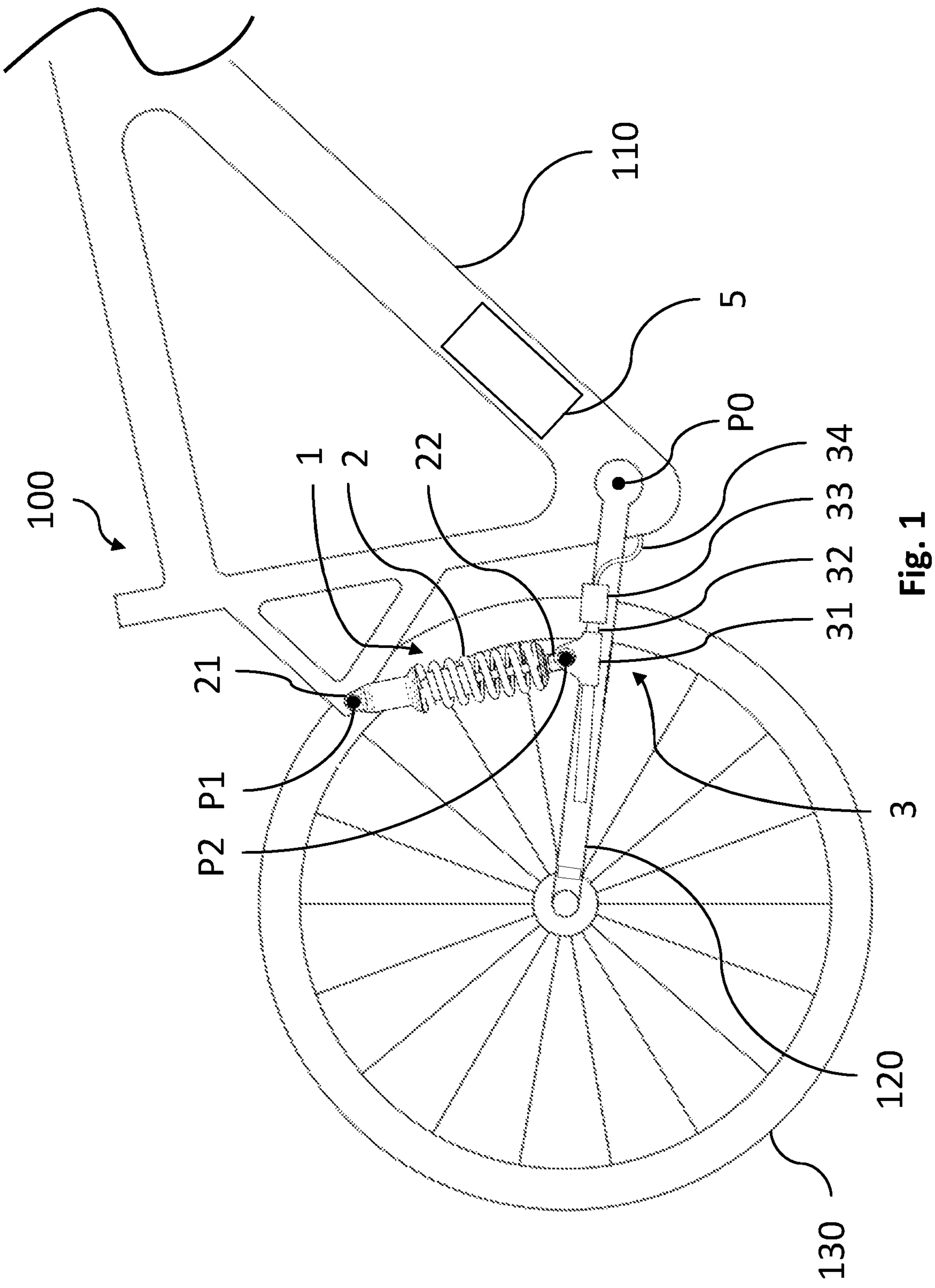
FIG. 1 shows a side view of a suspension arrangement according to one embodiment of the disclosure when arranged to a bike.

The present disclosure will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In the drawings, like numbers refer to like elements.

In the figures, a suspension arrangement 1 for a vehicle 100 is depicted in various embodiments and configurations. Generally, the suspension arrangement 1 is adapted to be arranged to a vehicle 100 comprising a wheel 130 arranged on a swing arm 120 adapted to be pivotable relative a vehicle part 110 about a swing arm pivot point P0, as shown e.g., in FIG. 1 wherein the suspension arrangement 1 is depicted arranged to a bike 100. The suspension arrangement 1 may be adapted for arrangement to a wide range of vehicles. While some figures depict the suspension arrangement 1 when arranged to a mountain bike 100, the suspension arrangement 1 is not limited to such application only. The suspension arrangement 1 may preferably be adapted for the category of vehicles known as micromobility vehicles.

Further, in reference to FIGS. 1-4, and FIGS. 8*a*, 8*b*, the suspension arrangement 1 according to respective embodiments of the disclosure is described when arranged to pedal bicycles (which may be provided with or without motor drive assist). However, the suspension arrangement 1 may likewise be adapted for other types of vehicles.

According to one embodiment, the suspension arrangement 1 comprises a shock absorber 2 providing a first mounting member 21 and a second mounting member 22 mutually displaceable by expansion and compression of the shock absorber 2. The suspension arrangement 1 is adapted to be arranged relative the vehicle part 110 and/or the swing arm 120, so that the first mounting member 21 provides a first pivot point P1 and the second mounting member 22 provides a second pivot point P2. The suspension arrangement 1 further comprises a pivot point adjustment device 3 adapted for enabling position adjustment of the first pivot point P1 and/or the second pivot point P2 relative the swing arm 120 to change a steady-state position of the shock absorber 2 relative the swing arm 120 in response to a load change. In FIG. 1, the shock absorber 2 is arranged relative the vehicle part 110 and the swing arm 120 so that the first mounting member 21 is pivotably connected to the vehicle part 110 and the second mounting member 22 is pivotably connected to the pivot point adjustment device 3. The pivot point adjustment device 3 comprises a mounting member 31 adapted to move along an axle 32 coupled to the actuator 33. The mounting member 31 and the axle 32 may for example engage via a threaded engagement. The actuator 33 operates such that the axle rotates and thereby displaces the mounting member 31 relative the axle. The pivot point adjustment device 3 may be controllable by automatic means (not shown). Connection means 34 may connect the pivot point adjustment device 3 to the automatic means.

Figure 2A:
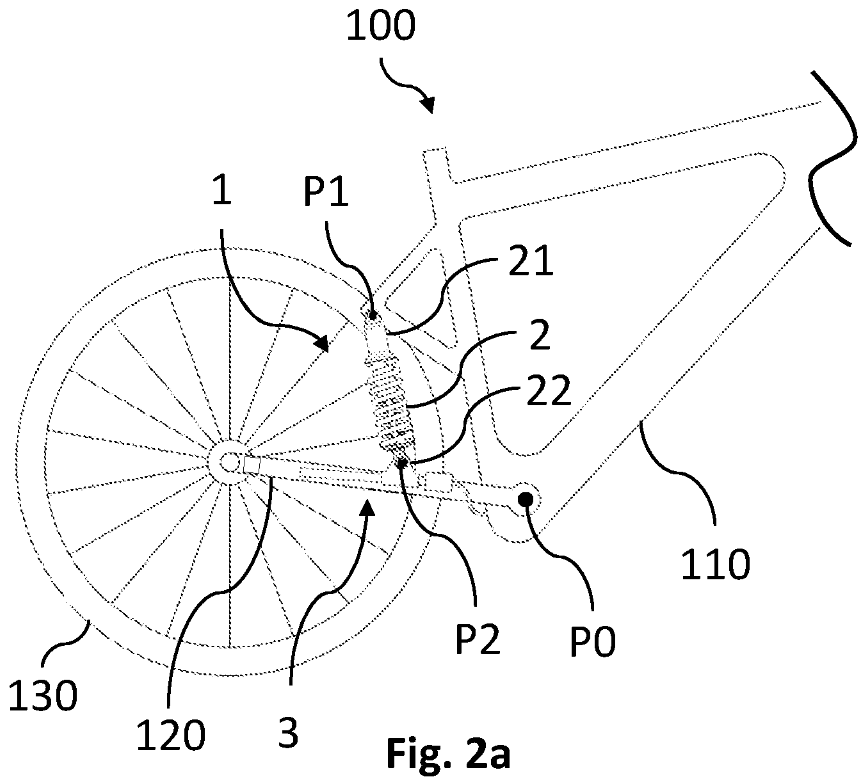
FIG. 2*a* shows a side view of a suspension arrangement according to one embodiment of the disclosure when arranged to a bike, wherein the suspension arrangement is arranged in a first position.
Figure 2B:
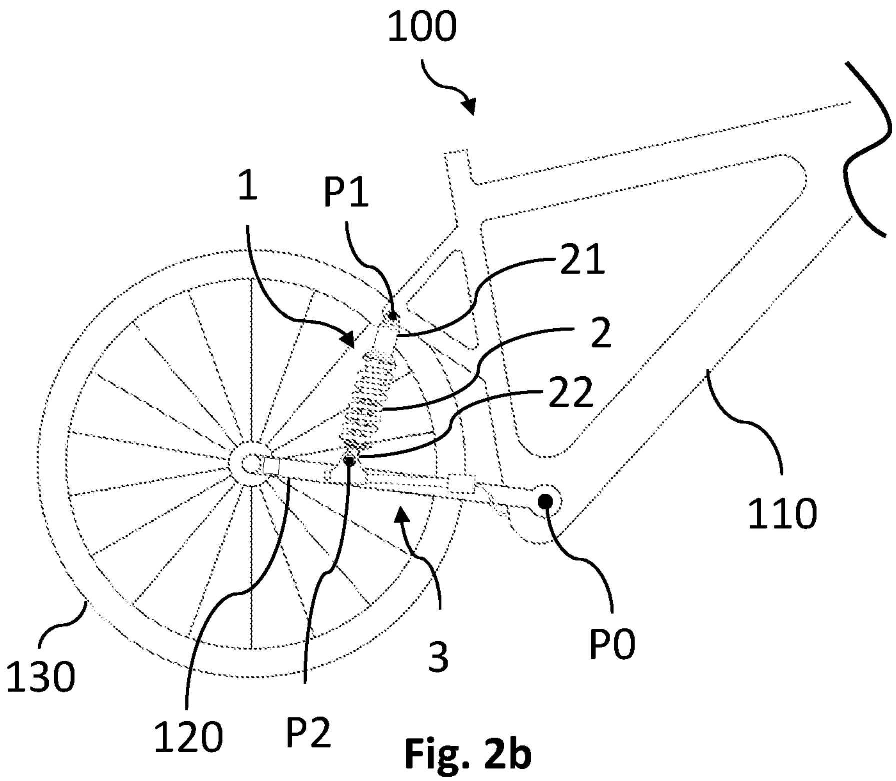
FIG. 2*b* shows a side view of a suspension arrangement according to one embodiment of the disclosure when arranged to a bike, wherein the suspension arrangement is arranged in a second position.

The pivot point adjustment device 3 is adapted for one of the two pivot points provided by the first and second mounting member 21, 22. For instance, as shown in FIGS. 2*a*, 2*b*, the pivot point adjustment device 3 is configured for moving the second pivot point P2 between a first position which is illustrated in FIG. 2*a* and a second position which is illustrated in FIG. 2*b*. According to one embodiment, the pivot point adjustment device 3 is provided as or comprising a linear or rotary actuator 3 defining a pivot point movement path along which a pivot point is moveable. Specifically, in FIGS. 2*a*, 2*b*, the second pivot point P2 is moveable along a linear path defined by the pivot point adjustment device 3. By changing the position of the second pivot point P2, the shock absorber 2 is moveable between different steady-state positions. The different steady-state positions may be associated with different loads, and/or other travel conditions such as road condition, velocity, etc. A change in load may include a change in load weight (including an operator of the vehicle). A change in load may also include a change in mass centrum of the vehicle/load configuration when the load weight remains the same. A change in load may include both a change in load weight and mass centrum.

The suspension arrangement 1 enables adjustment in vehicle suspension for improved comfort and damping.

Moreover, it further allows adjusting of a vehicle operating height. The suspension arrangement 1 enables adjustment of damping characteristics and vehicle operating height by one adjustment only.

Figure 8A:
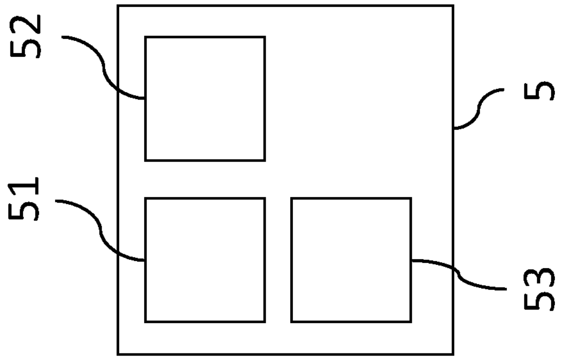
FIG. 8*a* shows a schematic view of at least some components of automatic means of the suspension arrangement according to one embodiment of the disclosure.

In reference to FIG. 1 and FIG. 8*a*, the suspension arrangement 1 may further comprise automatic means 5 for enabling automatic position adjustment of the first pivot point P1 and/or the second pivot point P2. The automatic means 5 may be an ECU or comprise an ECU provided with a processing unit 51. The automatic means 5 may comprise a processing unit 51. The processing unit 51 may be adapted to receive one or more input signals. The processing unit 51 may be adapted to process said received one or more input signals. The processing unit 51 may provide instructions for controlling the pivot point adjustment device 3, for instance to a control means 52. The automatic means 5 may comprise one or more sensors 53 adapted for measuring a respective one or more suspension parameter. The automatic means 5 may comprise one or more memory modules for storing e.g., sensory data, driving data, etc. The automatic means 5 may comprise connecting means for connecting the processing unit 51 to said one or more sensors 53 and connecting the processing unit 51 to said control means 52. The shock absorber may comprise control means for enabling adjustment of damping characteristic. Said automatic means 5 may comprise connecting means for connecting the processing unit 51 to control means for controlling the shock absorber.

Although the suspension arrangement is illustrated to be arranged on a rear swing arm of a bike, the suspension arrangement is not limited to arrangement on a rear swing arm of a bike when arranged to a bike, it may be arranged to a front fork of the bike.

Figure 3:
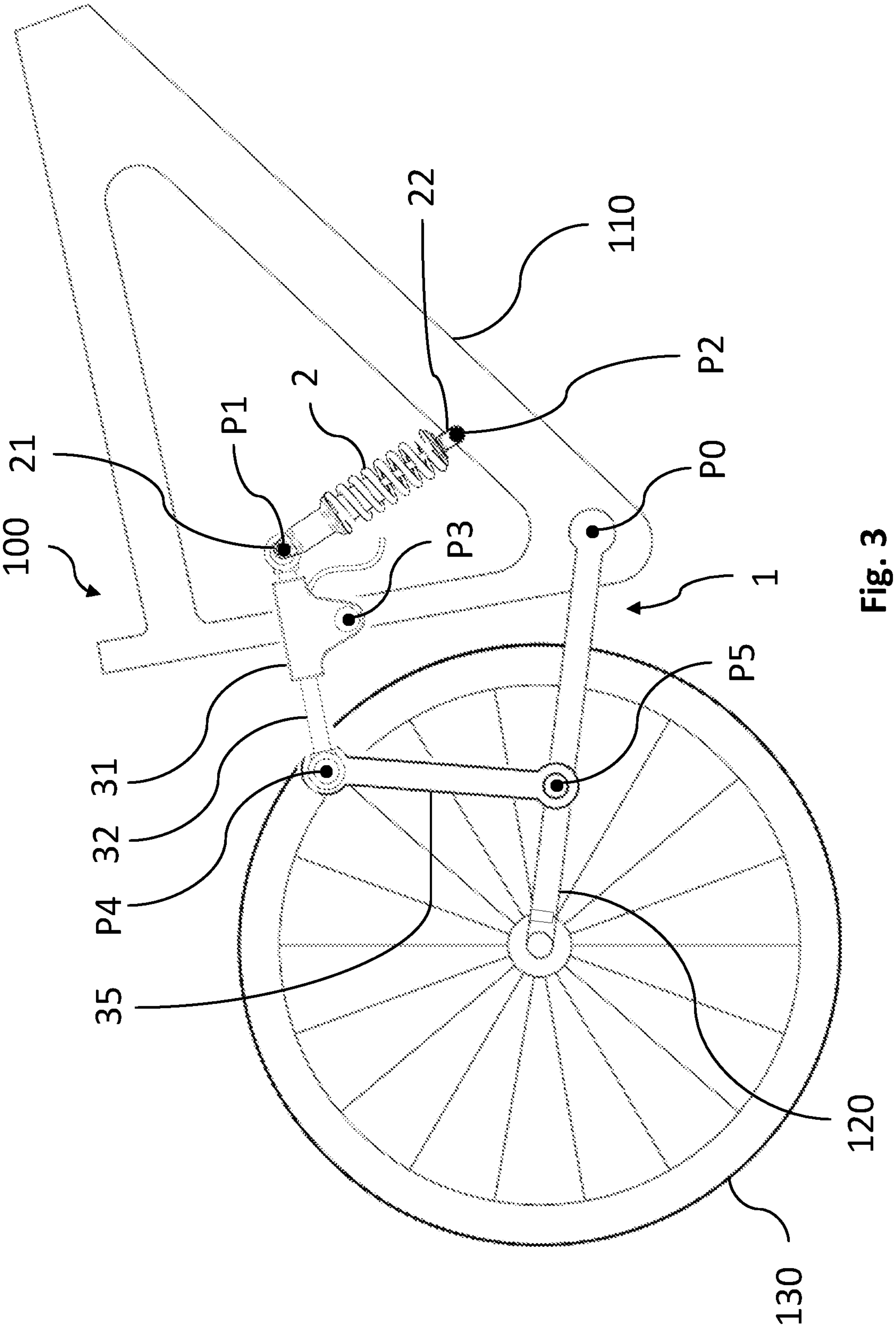
FIG. 3 shows a side view of a suspension arrangement according to one embodiment of the disclosure when arranged to a bike.

According to one embodiment, the suspension arrangement 1 comprises a linkage arrangement. Such an embodiment is illustrated in FIG. 3 wherein the suspension arrangement 1 is arranged in a coupling manner between the vehicle part 110 and the swing arm 120. In this embodiment, the shock absorber 2 is pivotably coupled to the vehicle part 110 via the second mounting member 22 to pivot about the second pivot point P2, whereas the first mounting member 21 is pivotably coupled to a first link member 32 of the linkage arrangement to pivot about a first pivot point P1. The first link member 32 is pivotably coupled to a second linkage member 35 to pivot about a fourth pivot point P4. The second link member 35 is pivotably coupled to the swing arm 120. The pivot point adjustment device 3 comprises a mounting part 31 which is coupled to the first link member 32 and is pivotably coupled to the vehicle part 110 to pivot about a third pivot point P3. The pivot point adjustment device 3 is adapted to actuate movement of the mounting member 31 relative the first link member 32 to adjust the position of the first pivot point P1 relative the swing arm. Moreover, the pivot point adjustment device 3 is adapted to actuate movement of the first link member 32 to adjust the relative position of the second pivot point P1 relative the third pivot point P3. By this embodiment, a greater range of motion range is enabled.

Figure 4:
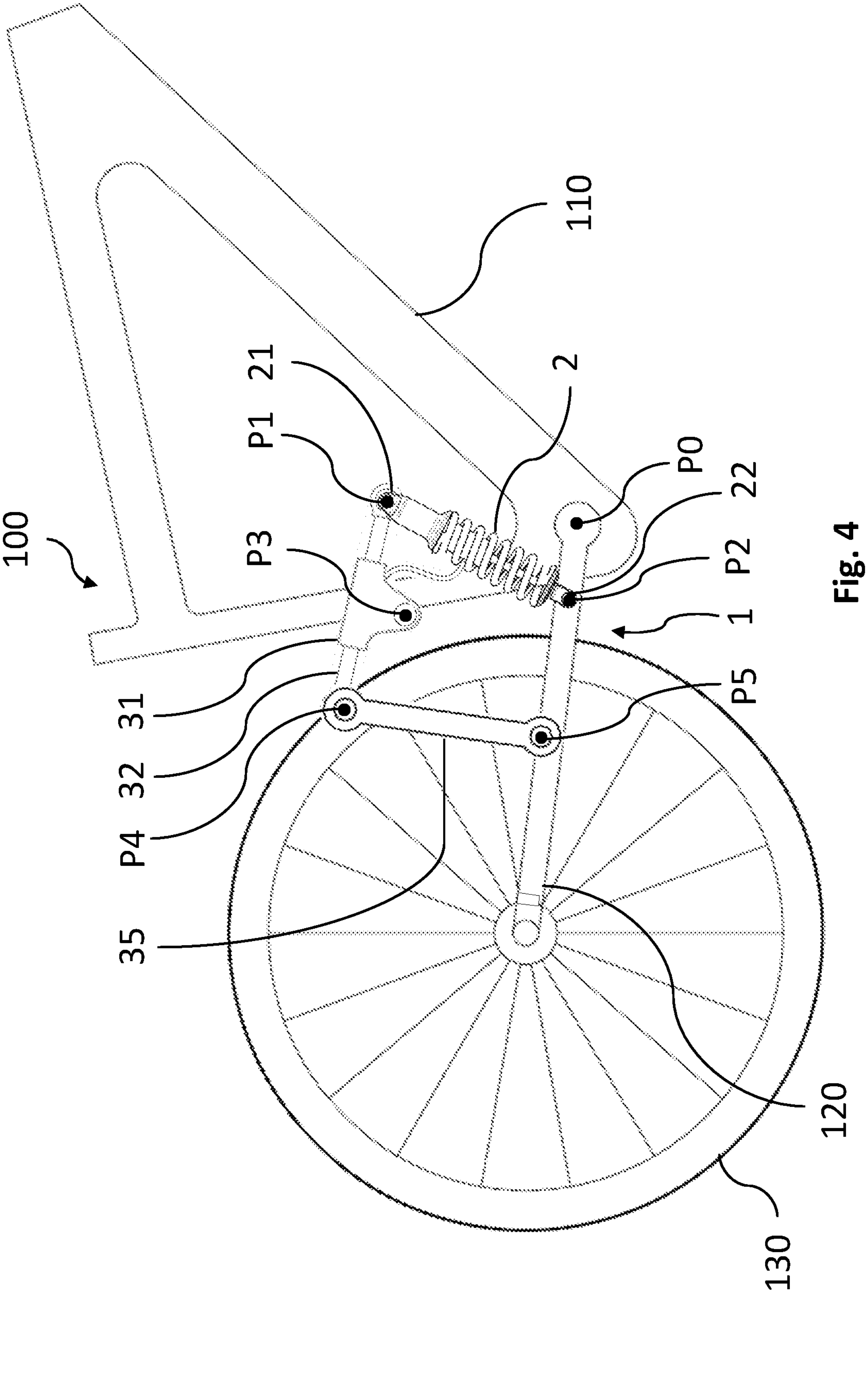
FIG. 4 shows a side view of a suspension arrangement according to one embodiment of the disclosure when arranged to a bike.

FIG. 4 shows a further embodiment wherein the second mounting member 22 is pivotably connected to the swing arm 120 rather than the vehicle part 110 as in the embodiment shown in FIG. 3. The embodiment of FIG. 4 thus shows an alternative arrangement of the shock absorber and further shows that the suspension arrangement can be arranged relative the vehicle part 110 and the swing arm 120 in a variety of ways while still providing the same overarching functionality.

Figure 5A:
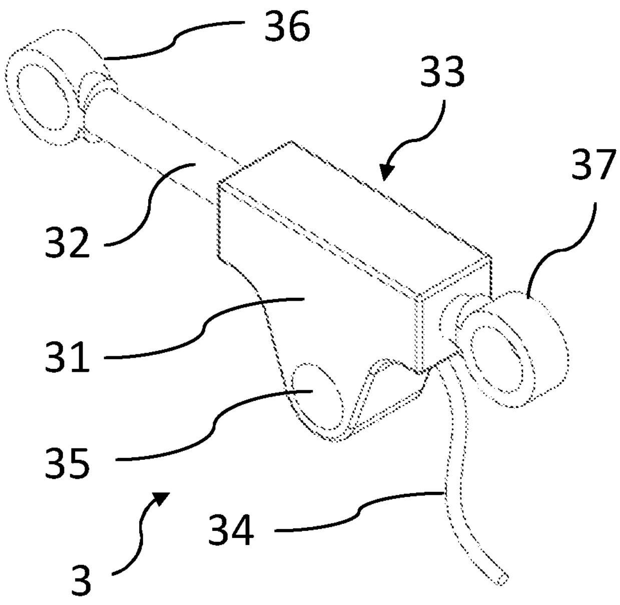
FIG. 5*a-c* show perspective views of a suspension arrangement according to one embodiment of the disclosure in terms of some of its elements.
Figure 5B:
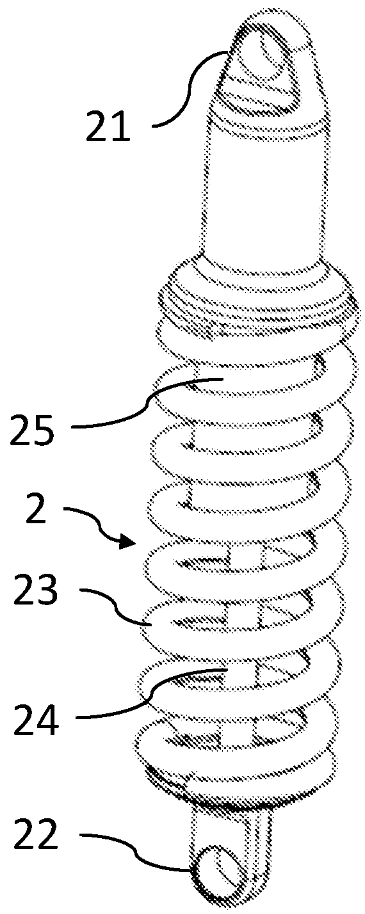
Figure 5C:
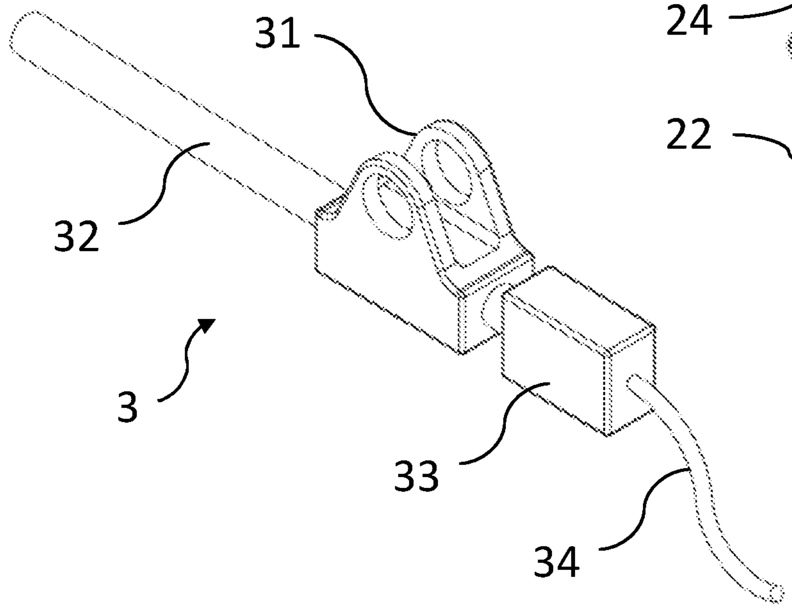

FIGS. 5*a-c* show the suspension arrangement 1 in terms of some of its elements, depending on embodiment. FIG. 5*a* show one embodiment of the pivot point adjustment device 3. The pivot point adjustment device 3 depicted in FIG. 5*a* comprises a mounting member 31, an axle 32 wherein a respective mounting member 36, 37 is attached at a longitudinal end of the axle 32. The pivot point adjustment device 3 depicted in FIG. 5*a* further comprises through-holes in each of the mounting members 31, 36, 37 for receiving a pin, axle, or the like for pivotably connecting. The mounting member 31 houses an actuator adapted for displacing the axle relative the mounting member 31. The actuator is connected to connecting means 34 for remote controlling.

FIG. 5*b* shows a shock absorber 2. The shock absorber comprises a first mounting member 21 and a second mounting member 22 adapted to mutually move relative each other. The first mounting member 21 is connected to the main body 25 of the shock absorber 2 housing a damping fluid reservoir. The second mounting member 22 is connected to a piston rod adapted to engage with the damping fluid reservoir. The shock absorber 2 comprises a spring 23 arranged for moving apart the piston rod 24 and the main body 25 of the shock absorber to a steady-state position.

FIG. 5*c* shows a pivot point adjustment device 3 according to one embodiment of the disclosure. The pivot point adjustment device 3 comprises a mounting member 31 arranged to be axially moveable relative an axle 32. The pivot point adjustment device 3 comprises an actuator 33 arranged for moving the mounting member 31 relative the axle 32. The pivot point adjustment device 3 is adapted to be operable from a distance via control means which connect to the actuator 33 via connecting means 34.

Figure 6A:
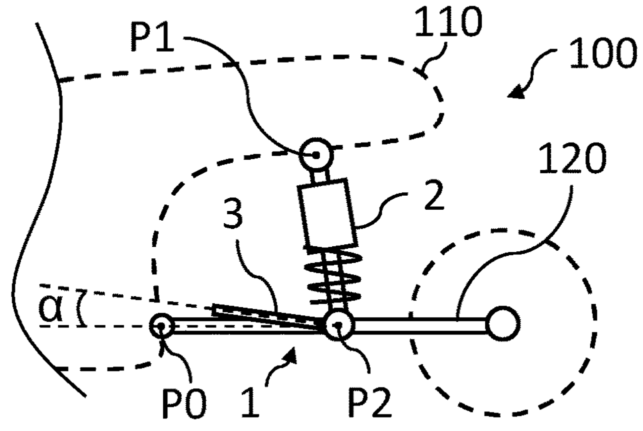
FIG. 6*a-c* show side views of a suspension arrangement according to one embodiment of the disclosure when arranged to a generic vehicle.
Figure 6B:
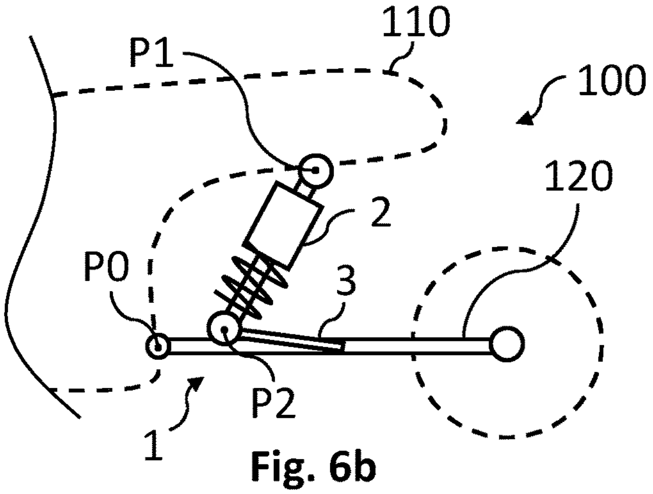
Figure 6C:
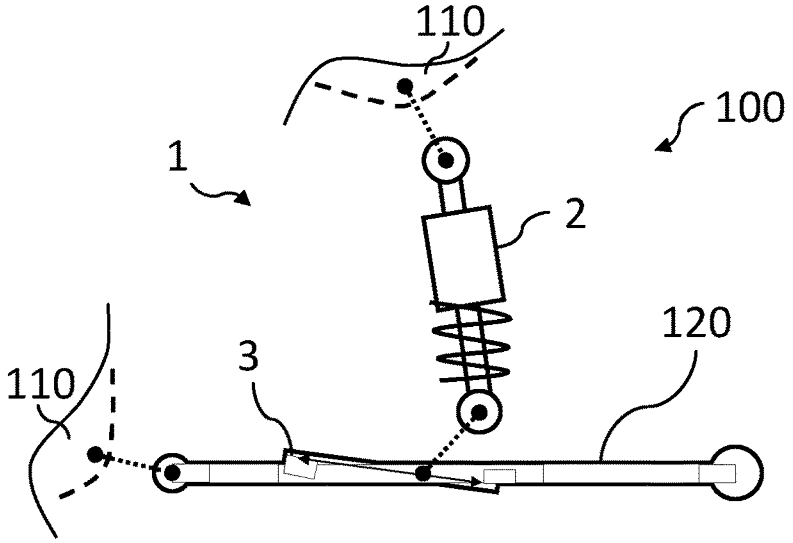

FIG. 6*a-c* show one embodiment of the suspension arrangement 1 arranged to a vehicle part 110 of a vehicle 100. The portion of the vehicle 100 depicted is illustrated in dashed lines, which implies that the vehicle is not limited to any type or category in particular. The suspension arrangement 1 is arranged so that the shock absorber 2 is pivotably arranged via a mounting member to pivot relative the vehicle part 110 about a first pivot point P1 and arranged so that another mounting member of the shock absorber is pivotably arranged to the pivot point adjustment device 3 to pivot about a second pivot point P2. The pivot point adjustment device 3 is adapted to move the second pivot point P2 along a pivot point movement path which is inclined relative a longitudinal axis of the swing arm by an angle α. FIG. 6*a* show the suspension arrangement 1 when the shock absorber 2 is in a first steady-state position, whereas FIG. 6*b* show the suspension arrangement 1 when the shock absorber 2 is in a second steady-state position. FIG. 6*c* show an exploded view of the suspension arrangement 1.

Figure 7A:
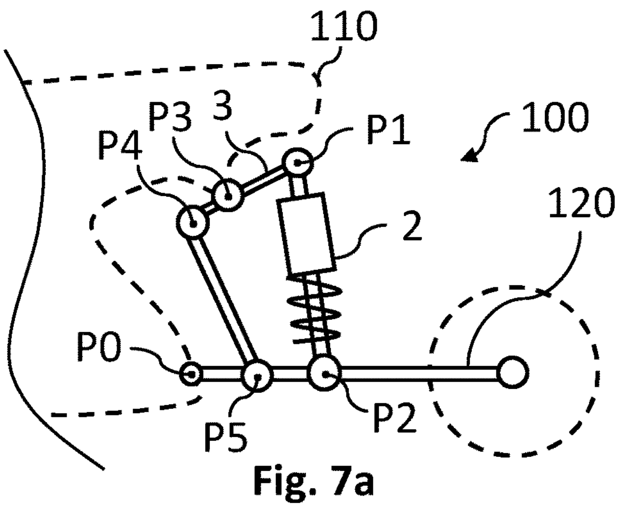
FIG. 7*a-c* show side views of a suspension arrangement according to one embodiment of the disclosure when arranged to a generic vehicle.
Figure 7B:
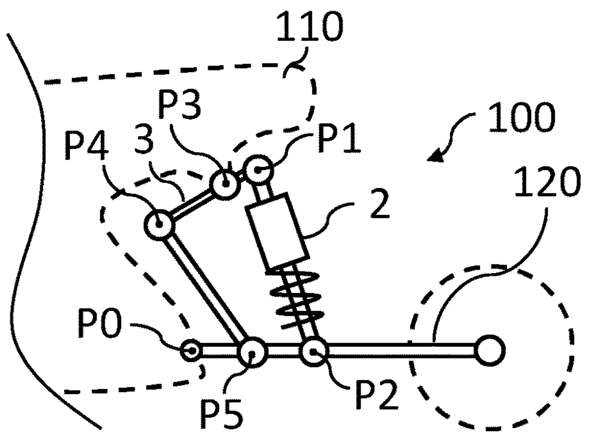
Figure 7C:
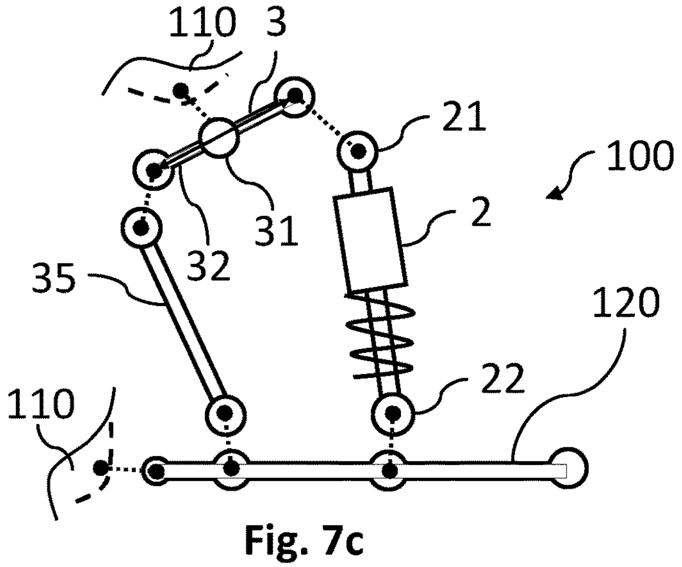

FIG. 7*a-c* show one embodiment of the suspension arrangement 1 arranged to a vehicle part 110 of a vehicle 100. The portion of the vehicle 100 depicted is illustrated in dashed lines, which implies that the vehicle is not limited to any type or category in particular. The suspension arrangement 1 is arranged so that the shock absorber 2 is pivotably arranged via a mounting member to a linkage arrangement to pivot about a first pivot point P1. The pivot point adjustment device 3 is arranged to the linkage arrangement. The pivot point adjustment device 3 is pivotably arranged to the vehicle part 110 to pivot about a third pivot point P3. The linkage arrangement further defines a fourth pivot point P4 and a fifth pivot point P5. FIG. 7*a* show the suspension arrangement 1 when the shock absorber 2 is in a first steady-state position, whereas FIG. 7*b* show the suspension arrangement 1 when the shock absorber 2 is in a second steady-state position. FIG. 7*c* show an exploded view of the suspension arrangement 1.

Figure 8:
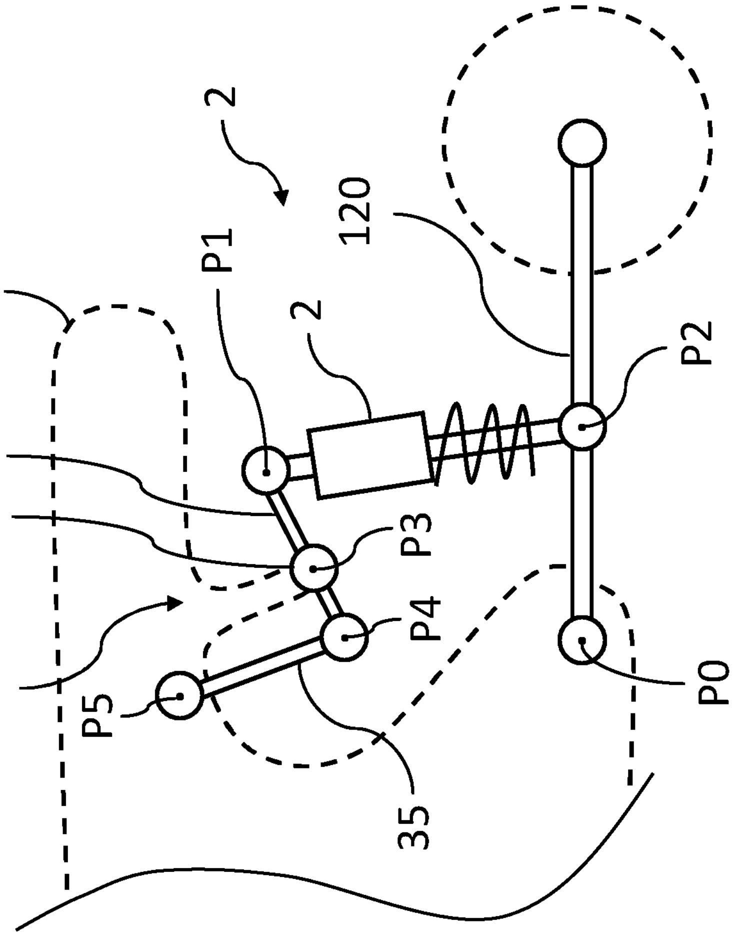
FIG. 8 shows a side view of a suspension arrangement according to one embodiment of the disclosure when arranged to a generic vehicle.

FIG. 8 show a suspension arrangement 1 according to one embodiment of the disclosure. In this embodiment, the shock absorber 2 is pivotably arranged to the swing arm via one mounting member to pivot about a second pivot point P2. One other mounting member of the shock absorber 2 is pivotably arranged to the pivot point movement device 3 to pivot about a first pivot point P1. The pivot point movement device 3 comprises a mounting member pivotably arranged to a vehicle part 110. The mounting member houses an actuator arranged to actuate movement of an axle or link member 32 connecting to the shock absorber. The axle or link member 32 is further arranged to pivotably connect to a second link member 35 pivotably arranged to the vehicle part 110 to pivot about a fifth pivot point P5. The when the swing arm 120 pivots relative the vehicle part 110 about pivot point P0, the suspension arrangement 1 may damp the movement in a preferred manner depending on which steady-state position the shock absorber is set to.

Figure 8B:
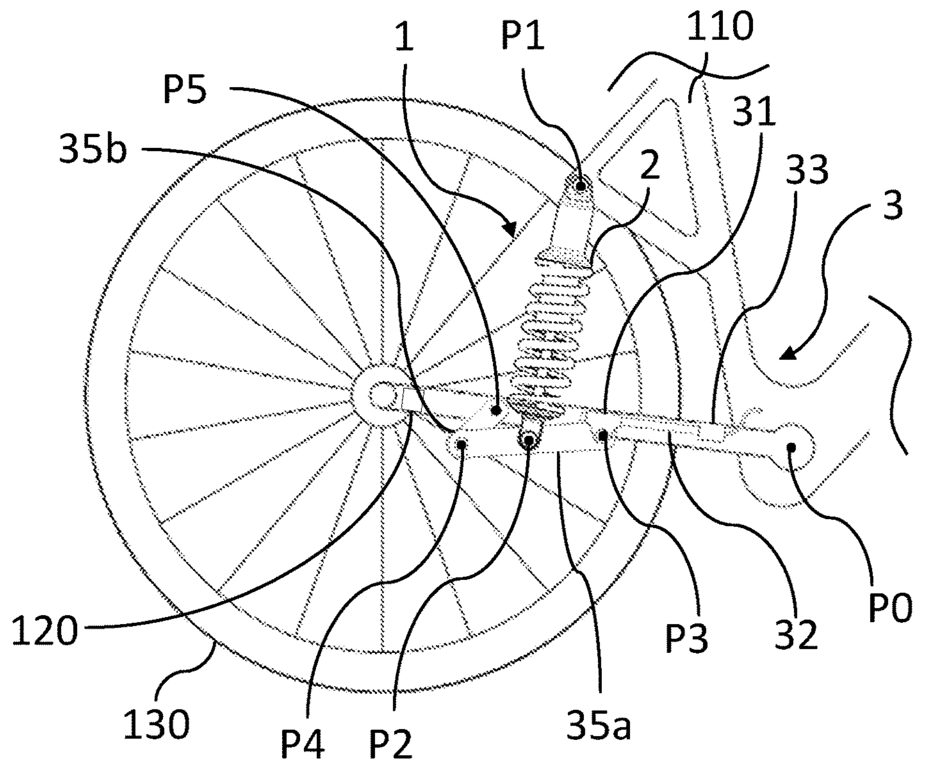
FIG. 8*b-c* show a suspension arrangement according to two respective embodiments of the disclosure.

FIG. 8*b* shows a suspension arrangement 1 according to one embodiment of the disclosure. In this embodiment, the shock absorber 2 is pivotably arranged to a link arrangement comprising two link members 35*a*, 35*b* pivotably connected to one another to pivot about pivot point P4. One of the link members 35*b* is further pivotably arranged to the swing arm 120 to pivot about pivot point P5 while the other of the link members 35*a* is pivotably arranged to a mounting member 31 of the pivot point adjustment device 3 to pivot about pivot point P3, which mounting member 31 is moveable along an axle or link member 32 by means of actuator 33. One mounting member of the shock absorber 2 is pivotably arranged to the first link member 35*a* to pivot about the second pivot point P2. One mounting member of the shock absorber 2 is pivotably arranged to the vehicle part 110 to pivot about the first pivot point P1. Thus, by means of the pivot point adjustment device 3, the second pivot point P2 may be adjusted in terms of position relative the vehicle part 110 by moving the mounting member 31 relative the axle or link member 32 which results in a changed state of the link arrangement and an adjusted position of the second pivot point P2.

Figure 8C:
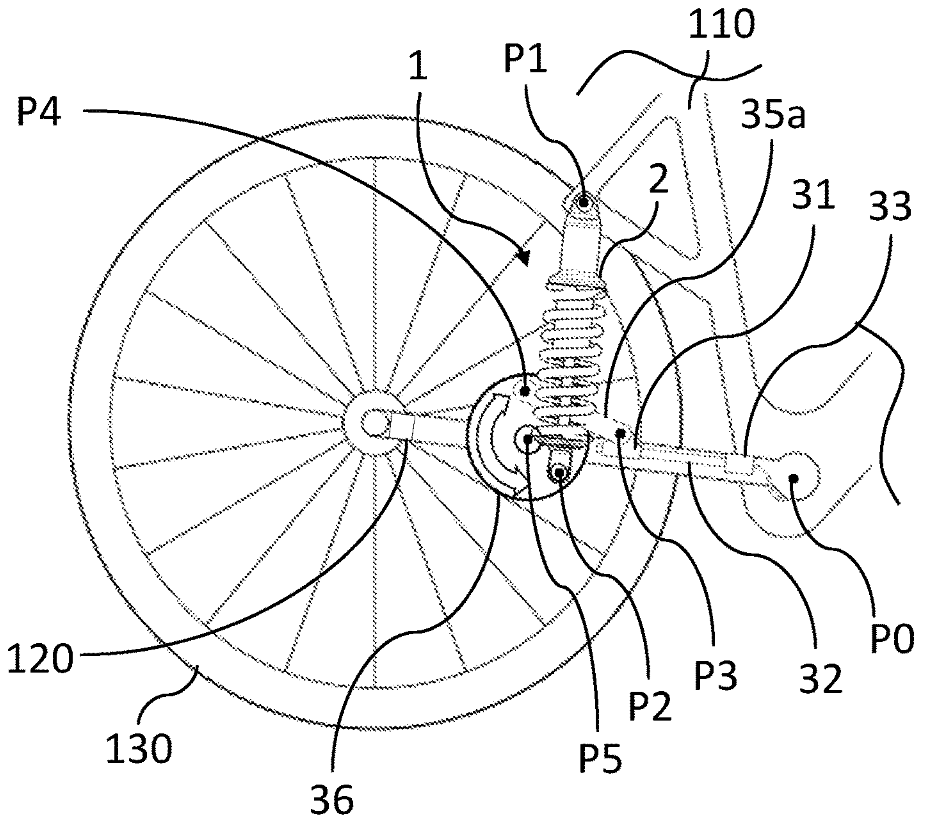

FIG. 8*c* shows a suspension arrangement 1 according to one embodiment of the disclosure. In this embodiment, the shock absorber 2 is pivotably arranged to pivot about the second pivot point P2, which second pivot point P2 is adjustable in terms of position by means of a rotary actuator. The rotary actuator comprises a rotatable disc member 36 adapted for rotatable motion about the pivot point P5. One mounting member of the shock absorber 2 is pivotably arranged to said rotatable disc member 36 so that the pivot point movement path is an arc. The rotatable motion of the rotatable disc member 36 is controlled by means of a link member 35*a* pivotably arranged to the rotary disc member 36 to pivot about pivot point P4, said link member 35*a* also being pivotably arranged to a mounting member 31 adapted to be moveable along axle or link member 32 by means of actuator 33. Thus, be means of the pivot point adjustment device 3, the second pivot point P2 may be adjusted in terms of position relative the vehicle part 110 by moving the mounting member 31 relative the axle or link member 32 which results in a rotation of the rotary disc member 36 and an adjusted position of the second pivot point P2.

Figure 9A:
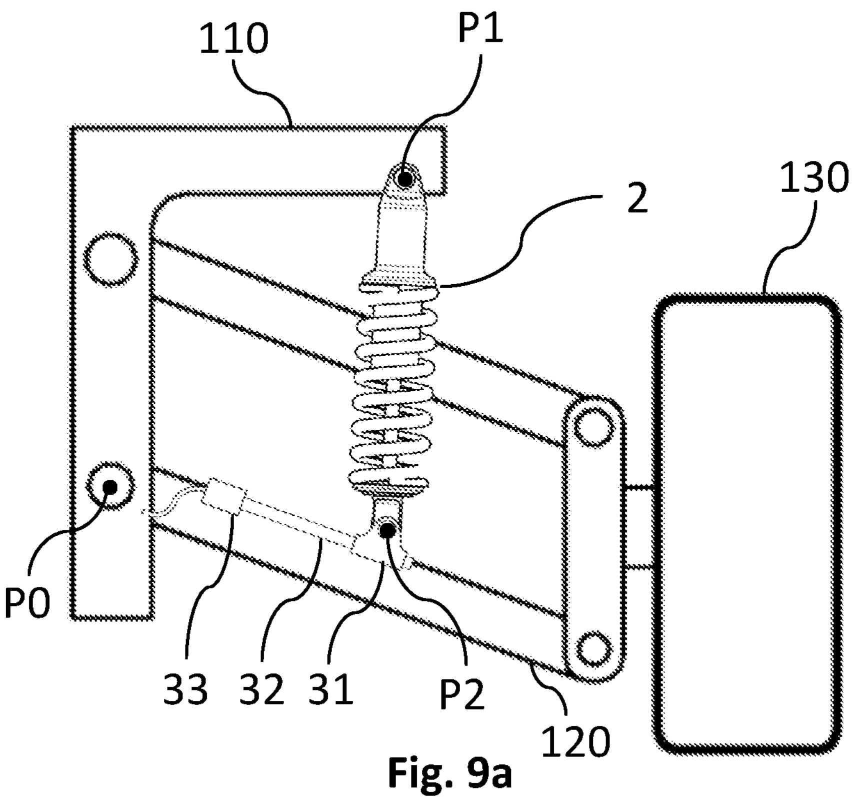
FIG. 9*a-b* show side views of a suspension arrangement according to one embodiment of the disclosure when arranged to a generic vehicle.
Figure 9B:
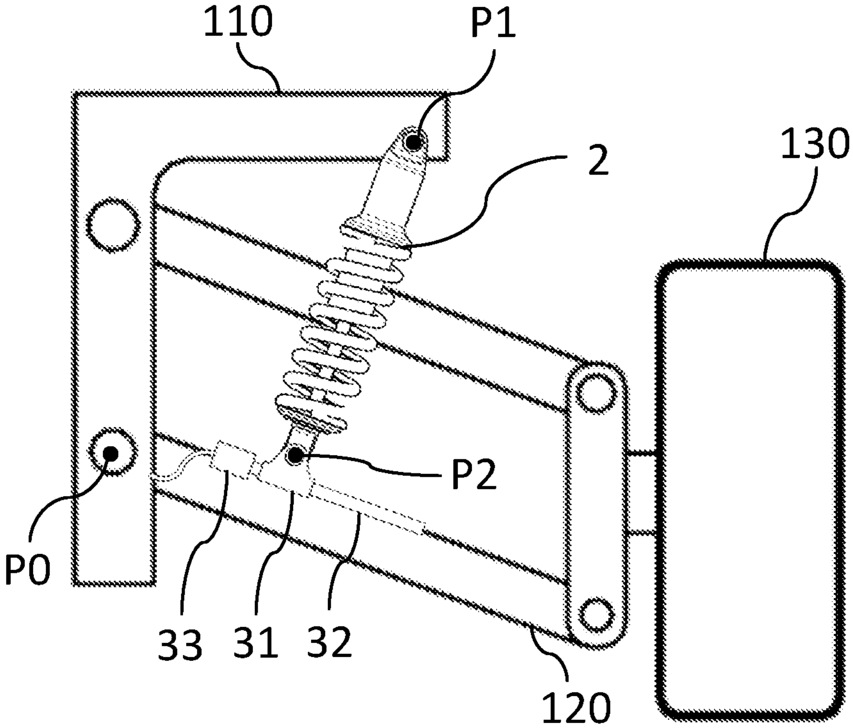

FIGS. 9*a-b* show a further embodiment of the suspension arrangement 1. It is in principle the same arrangement as shown in FIG. 1 but the swing arm is designed as a parallel-link swing arm 120. Each of the two parallel links are pivotable relative the vehicle part about a respective pivot point P0. A wheel 130 is arranged to the swing arm. FIG. 9*a* shows a first steady-state position of the shock absorber 2, whereas FIG. 9*b* shows a second steady-state position of the shock absorber 2.

Figure 9C:
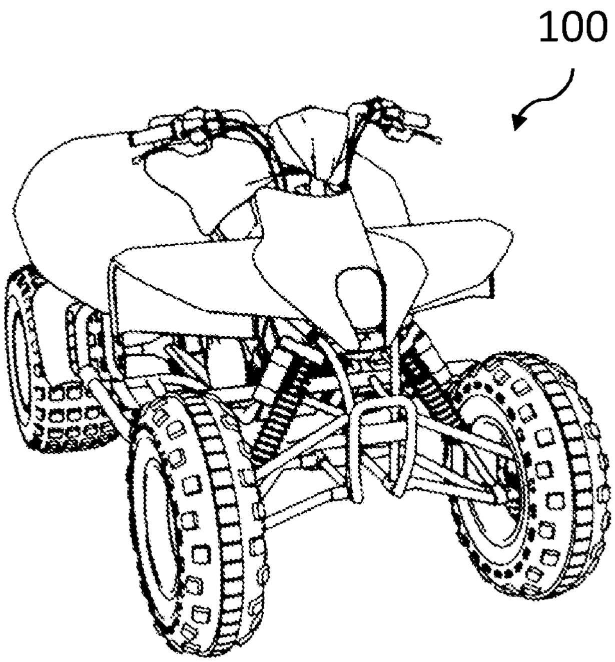
FIG. 9*c-d* show perspective views of a vehicle comprising a suspension arrangement according to one embodiment of the disclosure.
Figure 9D:
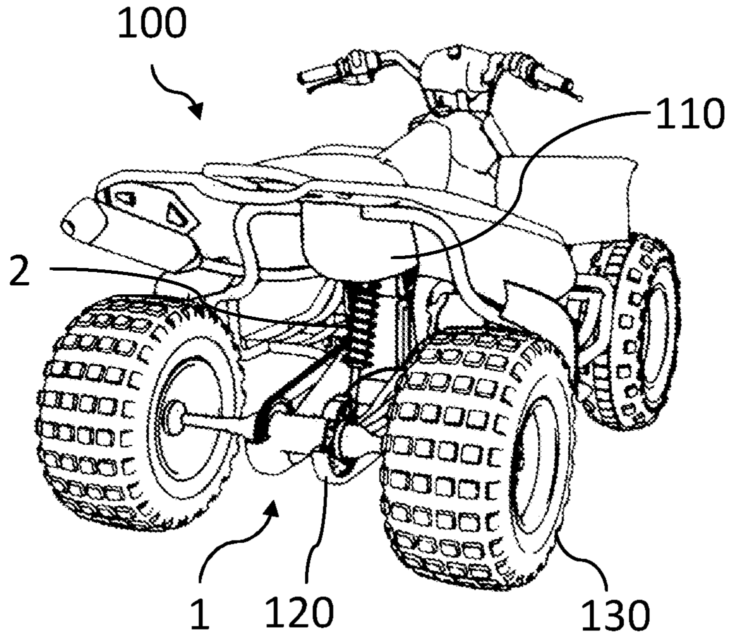

FIG. 9*c*, 9*d* show perspective views of a vehicle 100 comprising a suspension arrangement 1 according to one embodiment of the disclosure. Specifically, FIG. 9*c*, 9*d* show an example where the suspension arrangement 1 is arranged for managing a rear suspension of the vehicle 100. Moreover, the vehicle 100 comprise a swing arm 120 to which a wheel axle is arranged, and two wheels 130 is arranged along said wheel axle. The suspension arrangement 1 may however be adapted and arranged for other types of vehicles, such as various forms of micromobility vehicles. The suspension arrangement 1 may be adapted for bicycles, such as two-wheeled or three-wheeled bicycles.

Figure 10:
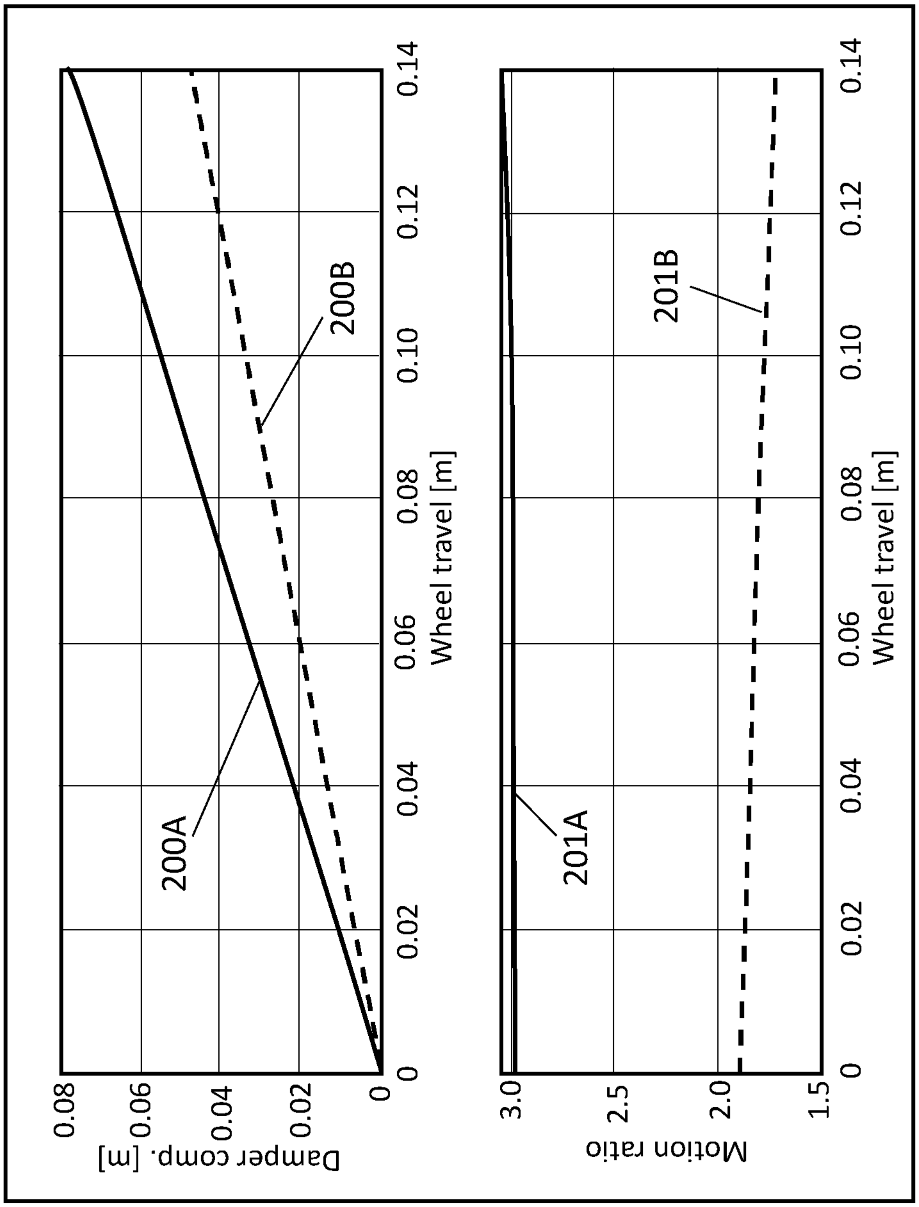
FIG. 10 shows a diagram of suspension characteristics of a suspension arrangement according to one embodiment of the disclosure.

FIG. 10 shows a diagram comprising an upper graph and a lower graph. The upper graph shows two damper-compression-to-wheel-travel curves 200A, 200B corresponding to different steady-state positions of the shock absorber 2 of the embodiment depicted in e.g., FIG. 1. Likewise, the lower graph shows two motion-ratio-to-wheel-travel curves 201A, 201B corresponding to different steady-state positions of the shock absorber of the embodiment depicted in e.g., FIG. 1. The suspension arrangement 1 enables pivot point adjustment within the area spanned by the respective curves in the upper and lower graphs. Thus, it can be seen that the suspension arrangement 1 provides flexible adjustment in response to load change.

Figure 11:
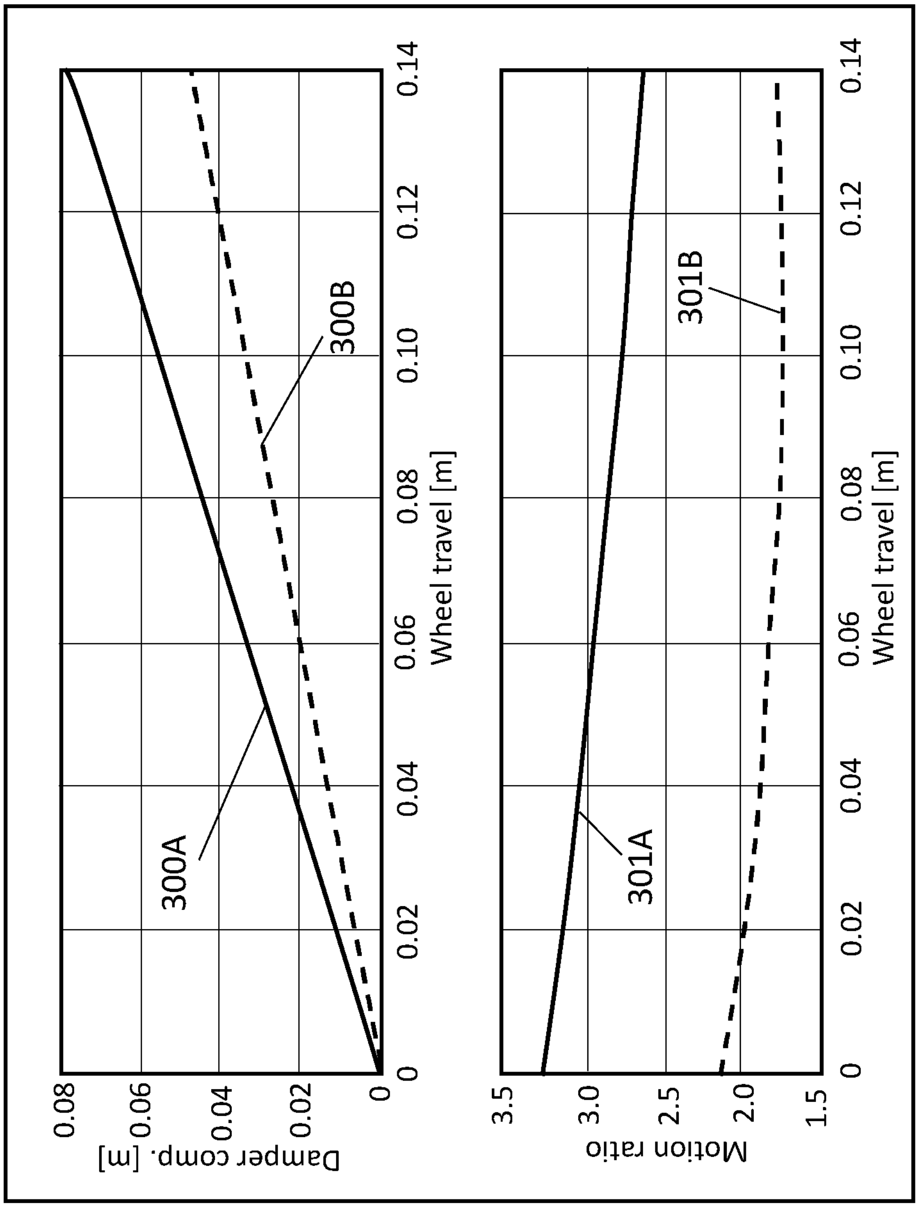
FIG. 11 shows a diagram of suspension characteristics of a suspension arrangement according to one embodiment of the disclosure.

Like FIG. 10, FIG. 11 also shows a diagram comprising an upper graph and a lower graph. The upper graph shows two damper-compression-to-wheel-travel curves 300A, 300B corresponding to different steady-state positions of the shock absorber 2 of the embodiment depicted in e.g., FIG. 3. Likewise, the lower graph shows two motion-ratio-to-wheel-travel curves 301A, 301B corresponding to different steady-state positions of the shock absorber of the embodiment depicted in e.g., FIG. 3. The suspension arrangement 1 enables pivot point adjustment within the area spanned by the respective curves in the upper and lower graphs. Thus, it can be seen that the suspension arrangement 1 provides flexible adjustment in response to load change. As a comparison, the embodiment shown in e.g., FIG. 3 provides a greater range of motion range than the embodiment shown in e.g., FIG. 1, while also providing a more progressive damping behaviour.

Figure 12:
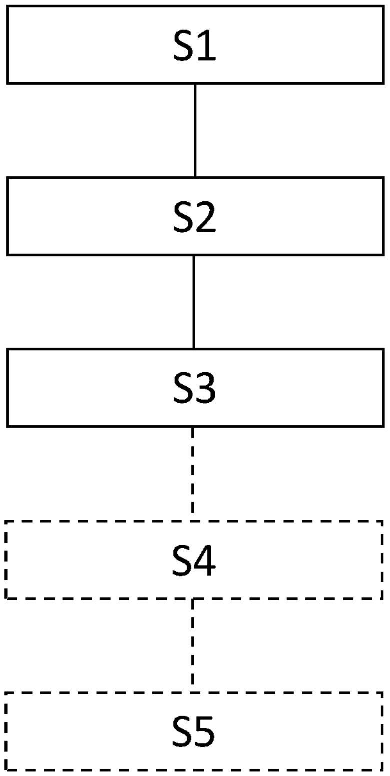
FIG. 12 shows a flowchart of a method for adjusting a suspension arrangement according to one embodiment of the disclosure.

FIG. 12 show a flow chart of a method for adjusting a suspension arrangement 1 according to one embodiment of the disclosure. The method comprises a step S1 of providing a vehicle 100 comprising

- a vehicle part 110;
- a swing arm 120 adapted to be pivotable relative the vehicle part about a swing arm pivot point P0;
- a wheel 130 arranged to the swing arm 120, and
- a suspension arrangement 1 comprising:
  - a shock absorber 2 providing a first mounting member 21 and a second mounting member 22 mutually displaceable by expansion and compression of the shock absorber 2, whereby the shock absorber 2 is arranged between the vehicle part 110 and the swing arm 120 so that the first mounting member 21 provides a first pivot point P1, and the second mounting member 22 provides a second pivot point P2, the method comprising the steps of determining S2 a load change of the vehicle 100, and adjusting S3 a position of the first pivot point P1 and/or the second pivot point P2 of the shock absorber 2 relative the swing arm 120 to change a steady-state position of the shock absorber 2 relative the swing arm 120 in response to the determined load change.

According to one embodiment, the method further comprises a step S4 of measuring a suspension parameter which is variable in response to the load change. The suspension parameter may be a position deviation of the swing arm 120 form a reference position relative the vehicle part 110. The step of measuring the suspension parameter may be done by means of a sensor. According to one embodiment, the method comprises a step (S5) of automatic position adjustment of the first pivot point P1 and/or the second pivot point P2 based on the sensor measurements provided by said sensor. Steps S4 and S5 are indicated by dashed lines in FIG. 12, to indicate them as optional.

In the drawings and specification, there have been disclosed preferred embodiments and examples of the disclosure and, although specific terms are employed, they are used in a generic and descriptive sense only and not for the purpose of limitation, the scope of the disclosure being set forth in the following claims.

What is claimed is:

1. A suspension arrangement for a vehicle, said vehicle comprising a wheel arranged on a swing arm adapted to be pivotable relative a vehicle part about a swing arm pivot point, the suspension arrangement comprising:

a shock absorber providing a first mounting member and a second mounting member mutually displaceable by expansion and compression of the shock absorber, whereby the shock absorber is adapted to be arranged relative the vehicle part and the swing arm so that the first mounting member provides a first pivot point and the second mounting member provides a second pivot point, and a pivot point adjustment device configured to adjust a position of the first pivot point and/or the second pivot point relative the swing arm to change a steady-state position of the shock absorber relative the swing arm in response to a load change.

2. The suspension arrangement according to claim 1, comprising a sensor configured to measure a suspension parameter or a physical quantity variable in response to said load change, and said load change is indicated by a variation of said suspension parameter or said physical quantity.

3. The suspension arrangement according to claim 2, wherein the sensor is a position sensor, and the suspension parameter is a position deviation of the swing arm from a reference position relative the vehicle part.

4. The suspension arrangement according to claim 2, wherein the suspension arrangement is configured to automatically adjust the position of the first pivot point and/or the second pivot point to change the steady-state position of the shock absorber relative the swing arm based on sensor measurements provided by said sensor.

5. The suspension arrangement according to claim 1, wherein the position adjustment of at least one pivot point of the first pivot point and the second pivot point of the shock absorber is enabled by a linear or rotary actuator defining a pivot point movement path along which said one pivot point is moveable.

6. The suspension arrangement according to claim 5, wherein the actuator enables stepless position adjustment of said one pivot point along the pivot point movement path.

7. The suspension arrangement according to claim 5, wherein the actuator is adapted to be attached to the swing arm and adapted for adjusting the position of said one pivot point of the shock absorber relative the swing arm.

8. The suspension arrangement according to claim 7, wherein the pivot point movement path and a longitudinal axis of the swing arm are nonparallel.

9. The suspension arrangement according to claim 5, wherein the actuator is adapted to be attached to the vehicle part and adapted for adjusting the position of said one pivot point of the shock absorber relative the swing arm.

10. The suspension arrangement according to claim 5, wherein the actuator is translationally moveable relative the swing arm using a linkage arrangement providing a third pivot point by which the linkage arrangement is connected to the vehicle part or the swing arm, wherein a distance between said one pivot point and the third pivot point is adjustable using the actuator.

11. The suspension arrangement according to claim 1, adapted so that the shock absorber is adjustable from a first steady-state position associated with a stiff motion-ratio-to-wheel-travel curve, to a second steady-state position associated with a soft motion-ratio-to-wheel-travel curve, wherein the soft motion-ratio-to-wheel-travel curve is offset relative the stiff motion-ratio-to-wheel-travel curve at their closest vertical distance by an offset increase of at least +10%, +20%, +30%, +40%, or +50% of the stiff motion-ratio-to-wheel-travel curve.

12. A vehicle comprising:

the vehicle part;

the swing arm adapted to be pivotable relative the vehicle part about the swing arm pivot point;

the wheel arranged to the swing arm, and the suspension arrangement according to claim 1.

13. The vehicle according to claim 12, wherein the vehicle is a bicycle.

14. The vehicle according to claim 13, wherein the bicycle is a two-wheeled or three-wheeled bicycle.

15. The suspension arrangement according to claim 1, wherein the load change comprises a change in load weight applied to the vehicle.

16. The suspension arrangement according to claim 15, wherein the change in load weight comprises at least one of a change in operator weight, passenger weight, or cargo weight applied to the vehicle.

17. A method of adjusting suspension of a vehicle, the method comprising a step of providing a vehicle comprising a vehicle part;

a swing arm adapted to be pivotable relative the vehicle part about a swing arm pivot point;

a wheel arranged to the swing arm, and a suspension arrangement comprising:

a shock absorber providing a first mounting member and a second mounting member mutually displaceable by expansion and compression of the shock absorber, whereby the shock absorber is arranged between the vehicle part and the swing arm so that the first mounting member provides a first pivot point, and the second mounting member provides a second pivot point, the method comprising a step of determining a load change of the vehicle, and a step of adjusting a position of the first pivot point and/or the second pivot point of the shock absorber relative the swing arm to change a steady-state position of the shock absorber relative the swing arm in response to the determined load change.

18. The method according to claim 17, wherein the determined load change comprises a change in load weight applied to the vehicle.

19. The method according to claim 18, wherein the change in load weight comprises at least one of a change in operator weight, passenger weight, or cargo weight applied to the vehicle.

* * * * *